Jan. 25, 1966 R. E. WISNIEFF 3,230,820
POLARIMETER
Filed Nov. 26, 1957 2 Sheets-Sheet 1
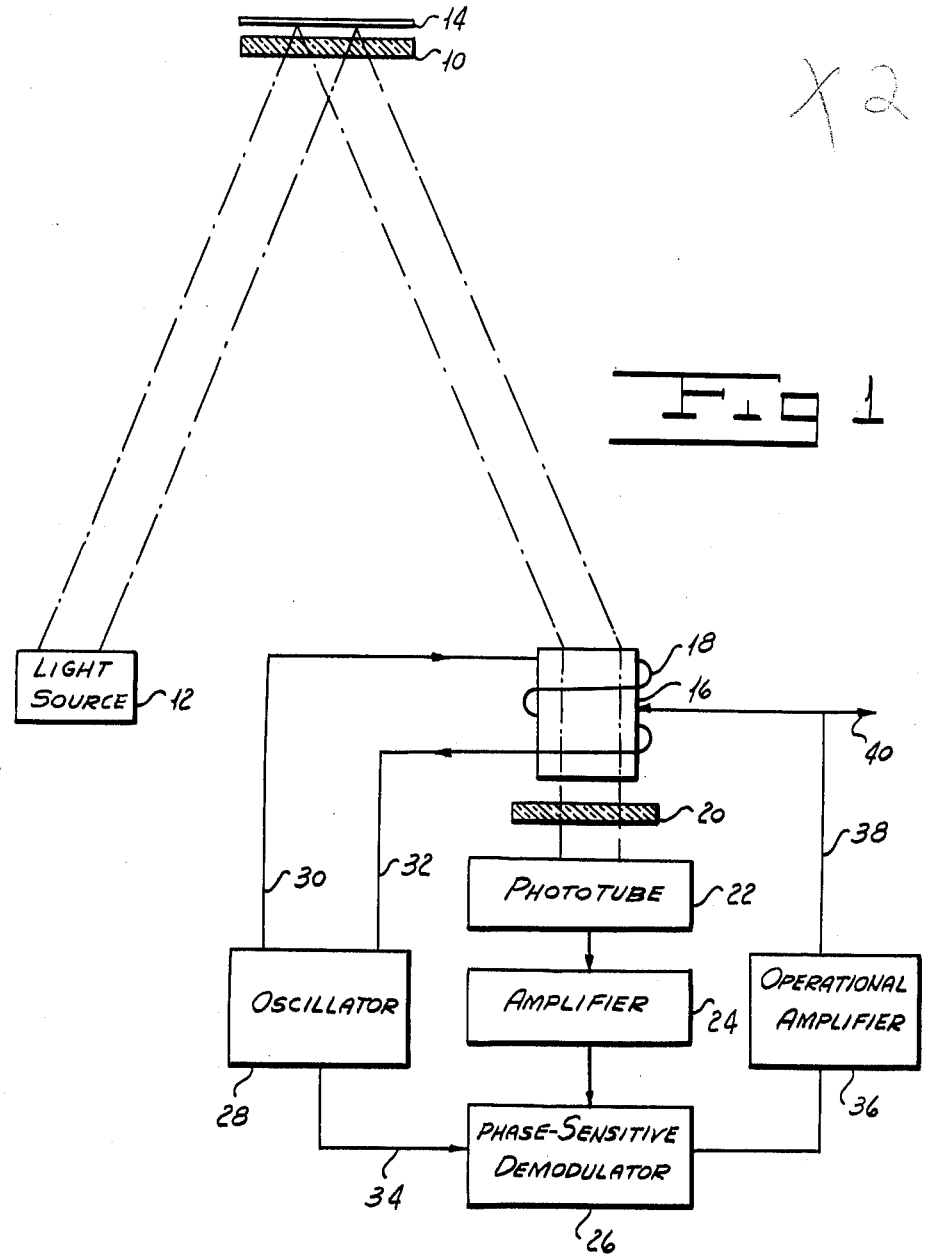
INVENTOR.
ROBERT E. WISNIEFF
BY
ATTORNEY

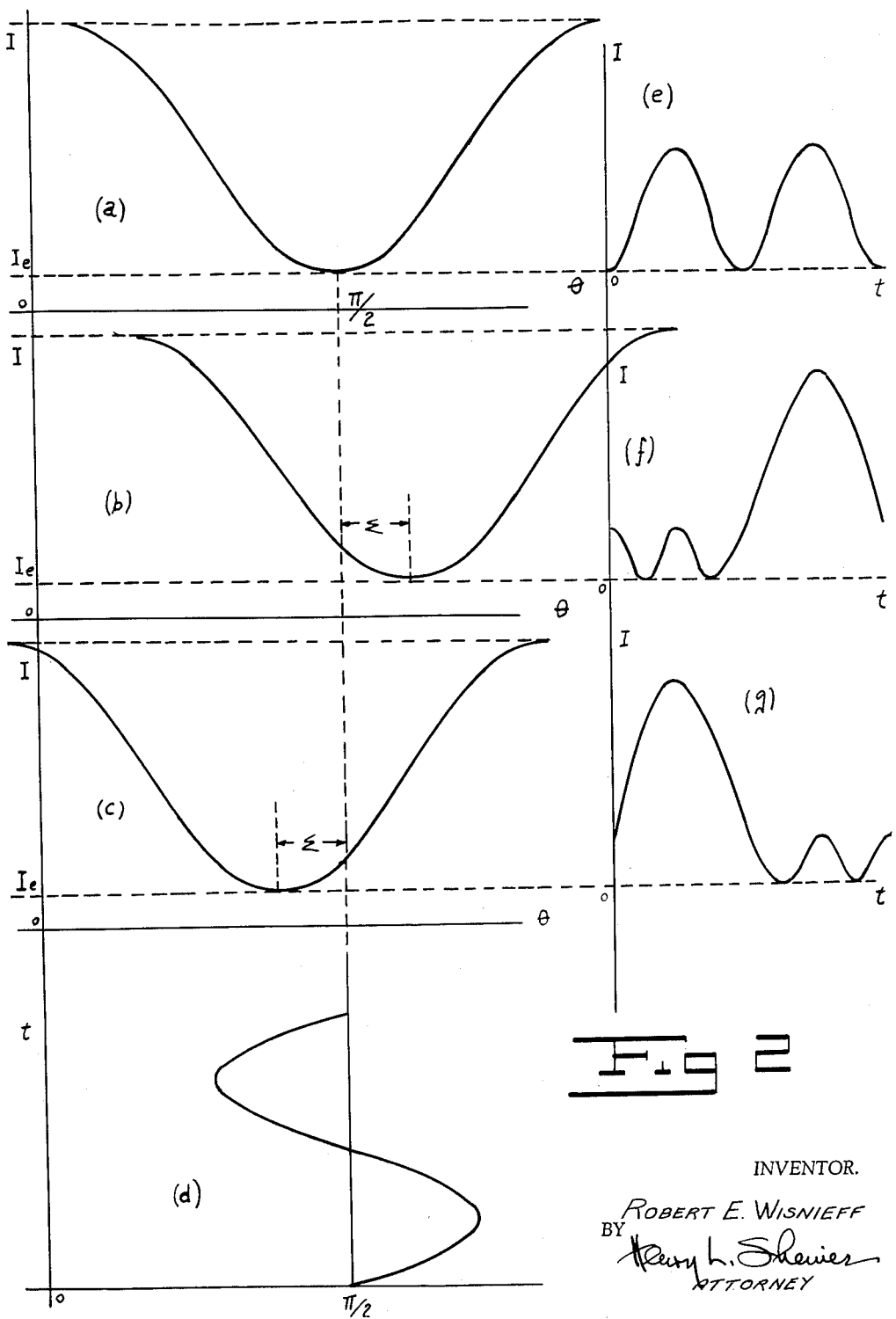

United States Patent Office 3,230,820
Patented Jan. 25, 1966

3,230,820
POLARIMETER
Robert E. Wisnieff, Yonkers, N.Y., assignor, by mesne assignments, to United Aircraft Corporation, East Hartford, Conn., a corporation of Delaware
Filed Nov. 26, 1957, Ser. No. 698,943
2 Claims. (Cl. 88—14)

My invention relates to a polarimeter and more particularly to an improved polarimeter for providing a precise indication of the relative angular displacement between two elements.

Polarimeters are known in the prior art for measuring the amount of rotation of the plane of polarization of a beam of polarized light. These polarimeters generally include a polarizer through which a beam of light is passed to produce a polarized beam which is directed to an analyzer. The analyzer is made up of a second polarizer through which the beam passes to a sensing device such as a photo-electric cell for determining the intensity of the light beam emerging from the second polarizer. If the polarizers of a polarimeter of the prior art are moved relatively angularly with respect to each other, the change in intensity of the light beam emerging from the analyzer polarizer is a function of the amount of relative rotation between the two polarizers.

Owing to the nonlinearity of the response curve of a pair of polarizers, the change in intensity of the light beam in response to a change in relative angular displacement between the polarizers is not a linear function of the change. Thus, if the sensing means output signal is used as a measure of relative rotation between the polarizers, an error is introduced. Further error is introduced owing to the inherent nonlinearity of the characteristic curve of the sensing device. It will be appreciated that these polarimeters of the prior art do not provide a satisfactory means for producing a precise measurement of the relative angular displacement between the polarizers. Theoretically, when the planes of polarization of a pair of polarizers are relatively angularly displaced through an angle of 90°, no light is transmitted through the second polarizer of the pair. Owing, however, to light leakage, there is a minimum of light transmitted through the polarizers at the null. This leads to difficulty in accurately locating the null position in polarizers of the prior art with the result that the accuracy of the measurements of displacement from the null is questionable. Moreover, these polarimeters of the prior art are not phase-sensitive since they provide no indication of the direction of rotation of the plane of polarization in response to relative rotation between the polarizers.

I have invented a polarimeter which produces an electrical signal which is directly proportional to the relative angular displacement between a pair of polarizing elements. My system accurately locates the null on the response curve of the polarizers. My polarimeter operates about the response curve null with the result that substantially no error is introduced owing to the nonlinearity of the response curve. My polarimeter is phase-sensitive. The output signal of my polarimeter has a magnitude which is proportional to the amount of displacement of the polarizers with respect to each other and a phase representing the direction of relative displacement.

One object of my invention is to provide a polarimeter for producing precise indications of the relative angular displacement between a pair of elements.

Another object of my invention is to provide a polarimeter which accurately locates the null of the response curve of the polarizers.

Still another object of my invention is to provide a polarimeter for producing indications which include substantially no error owing to the nonlinearity of the response curve of the polarizers.

A further object of my invention is to provide a polarimeter which is phase-sensitive.

A still further object of my invention is to provide a polarimeter for producing an electrical signal having a magnitude proportional to the angular displacement between a pair of polarizers and a phase representing the direction of the displacement.

Other and further objects of my invention will appear from the following description.

In general my invention contemplates the provision of a polarimeter including a first polarizer through which light is directed from a light source. After passing through the first polarizer the beam enters an analyzer including a Faraday cell or the like and a second polarizer. I energize the Faraday cell from a source of electrical energy to cause the cell to oscillate the plane of polarization of the light beam about the null point on the response curve of the polarizers. A sensing device such as a photoelectric cell or the like receives the beam as it emerges from the second polarizer and produces an electrical signal which is fed through an amplifier to a phase-sensitive demodulator. With the polarizers relatively angularly disposed to cause the light beam intensity to be at the null point on the response curve the phase-sensitive demodulator output signal passes through zero, thus accurately locating the response curve null point. When the relative angular disposition of the polarizers changes, the point on the response curve about which the Faraday cell oscillates the plane of polarization changes, with the result that the demodulator produces an output signal having a polarity representing the direction of the displacement from the null point. I provide an operational amplifier for amplifying and feeding this demodulator error signal back to the Faraday cell to shift the beam back toward the null point to reduce the demodulator output signal. The amplifier output signal has an amplitude proportional to the magnitude of the displacement between the polarizers and a phase representing the direction of displacement.

In the accompanying drawings which form part of the instant specification and which are to be read in conjunction therewith and in which like reference numerals are used to indicate like parts in the various views:

FIGURE 1 is a schematic view of my polarimeter.

FIGURE 2 is a series of curves showing the operation of my polarimeter as the point on the response curve about which the Faraday cell operates shifts.

Referring more particularly to FIGURE 1 of the drawings, I position a first polarizer 10 at a given location. This polarizer may be of any suitable type known to the art such, for example, as a Nicol prism or a Glan-Thompson prism. I direct a beam of light from a light source 12 through the polarizer 10 onto the surface of a reflector or mirror 14 which directs the beam back through the polarizer 10 toward an analyzer system including a Faraday cell 16 having a winding 18. As is known in the art, the Faraday cell is formed from a material having a high Verdet's constant such as flint glass or the like. The coil 18 surrounding the material of the Faraday cell is adapted to produce an electro-magnetic field parallel to the axis of the cell. A beam of polarized light passing through certain media having high Verdet's constants is rotated through an angle which is proportional to the field strength of the magnetic field. After travelling through the cell 16, the beam of light passes through a second polarizer 20 which may, for example, be a calcite Glan-Thompson prism. From the polarizer 20 the beam of light goes to a sensing device such as a photoelectric cell 22 which produces an electrical signal proportional to the intensity of the beam of light impinging on the cell.

An amplifier 24 amplifies the output signal from the photoelectric cell and applies it to a phase-sensitive demodulator 26.

As is known in the art, the intensity of a light beam transmitted through a pair of polarizers such, for example, as the polarizers 10 and 20 varies in accordance with the relationship (1) $$I = I_0 \cos^2 \theta$$

where $I_0$ is the intensity of the polarized beam before it enters the second polarizer, $\theta$ is the angle between the planes of polarization of the polarizers and $I$ is the intensity of the beam as it emerges from the second polarizer. Referring to FIGURE 2, I have shown the response curve of a pair of polarizers as a plot of the light intensity $I$ versus the angle $\theta$ between the planes of polarization of the polarizers. Each of the curves 2(a), 2(b) and 2(c) illustrates this relationship. It will be obvious from this response curve that the light intensity $I$ is not a linear function of the angle between the planes of polarization of the two polarizing elements. As a result, a rotation of one of the elements 10 and 20 with respect to the other will not produce a linear variation in the photocell output signal. It will further be obvious from an examination of the response curve that the null value of the phototube output signal occurs at a relative displacement of the planes of polarization of the polarizers of $\pi/2$. Owing, however, to leakage which occurs when the polarizers are thus crossed, the null is not perfect resulting in a minimum light intensity of $I_e$. This fact leads to difficulty in reading out the plane of polarization or the angle between the polarizers with the accuracy required in many instances. The determination of the precise location of this minimum value presents a problem to the art.

It has been demonstrated that the response curve possesses a high degree of symmetry about the relative displacement $\pi/2$. I propose to take advantage of this high degree of symmetry to locate the null with a high degree of accuracy, thus permitting very accurate measurements of the relative displacement of the polarizers to be made.

Referring again to FIGURE 1 an oscillator 28 supplies electrical energy to the winding 18 of the Faraday cell 16 through respective conductors 30 and 32. The electrical signal thus applied to the Faraday cell oscillates the plane of polarization of the light beam to scan the response curve of the pair of polarizers. A channel 34 applies the signal generated by oscillator 28 to the phase-sensitve demodulator 26. FIGURE 2(d) shows the rotation of the plane of polarization of the polarized beam about a median value $\pi/2$ with respect to time under the action of the current in the Faraday cell coil 18. If the polarizers 10 and 20 occupy the relative angular position $\pi/2$ then the plane of polarization will oscillate about the value $\pi/2$ and the intensity of light emerging from the second polarizer 20 will vary in accordance with the curve shown in FIGURE 2(e). It will be obvious that, with this variation of light intensity, the photocell output signal applied to demodulator 26 will cause the demodulator output signal to pass through zero, thus indicating that the system is at the null. If now the polarizers 10 and 20 are shifted from the $\pi/2$ position through an angle such, for example, as the angle $\epsilon$ the Faraday cell will scan a different portion of the response curve. By way of simplicity, I have illustrated such a relative displacement from the null position by shifting the response curve shown in FIGURE 2(b) by an amount $\epsilon$ from the null position. In this condition of the system the plane of polarization oscillates about a different point on the response curve to cause the intensity of the beam emerging from the second polarizer 20 to vary in accordance with the curve of FIGURE 2(f). A relative displacement of the polarizers through an angle $\epsilon$ in the other direction causes the Faraday cell to scan a portion of the response curve about a median point on the other side of the null. I have shown the effect of this displacement by shifting the response curve shown in FIGURE 2(c) to the left from the position shown in FIGURE 2(a). Under these conditions the intensity of the light beam emerging from the second polarizer varies in accordance with the relationship shown in FIGURE 2(g).

An analysis of FIGURE 2(e) shows that the intensity variation and thus the phototube output in FIGURE 2(e) consists of the second and higher harmonics of the oscillator frequency and no fundamental component. In FIGURES 2(f) and 2(g) a fundamental component is present. The fundamental component of FIGURE 2(g), however, is phase-shifted through 180° from the fundamental component shown in FIGURE 2(f). The phase-sensitive demodulator has a very high rejection ratio for even order harmonics and thus the photocell output corresponding to FIGURE 2(e) will cause voltage output of the phase-sensitive demodulator to pass through zero. It will be clear also that the photocell output signals corresponding respectively to FIGURES 2(f) and 2(g) produce demodulator outputs of opposite polarities. From the foregoing it will be appreciated that my polarizer is phase-sensitive, producing an electrical signal having a magnitude proportional to the magnitude of the displacement of the polarizers from the null position and a polarity representing the direction of displacement from the null position.

The results outlined hereinabove may readily be demonstrated analytically. In the relationship expressed in Equation 1 let $$\theta = \varphi_1 + \frac{\pi}{2}$$

considering the static orientation of the polarizers at $$\theta = \frac{\pi}{2}$$

so that $\theta = 0$ at the null $\varphi_1$ is the departure of the polarizers from the null. With this relationship I may write:

(2) $$I = I_0 \cos^2 \left(\varphi_1 + \frac{\pi}{2}\right) = I_0 \sin^2 \varphi_1$$

Equation 2 represents the variation in intensity of the polarized beam emerging from polarizer 20 with changes in $\varphi_1$. It is necessary next to account for the rotation of the plane of polarization of the beam which is introduced by the Faraday cell. As is known in the art of the rotation of the plane of polarization of a beam of polarized light passing through a Faraday cell is defined by the relationship:

(3) $$\varphi_2 = -cHl$$

where $H$ is the magnetic field strength, $l$ is the length of the light path in the field and $c$ is Verdet's constant. Assuming, for example, that the oscillator output signal is $E \sin \Omega t$, since the number of turns in the Faraday coil, the coil impedance, the coil radius, and the length of path $l$ are constant, the rotation introduced by the Faraday cell may be written as:

(4) $$\varphi_2 = A \sin \Omega t$$

The total rotation of the beam of polarized light passed through the polarizers and Faraday cell will be (5) $$\varphi_T = \varphi_1 + \varphi_2 = B + A \sin \Omega t$$

With this rotation the intensity of the beam impinging on the photocell 22 will vary in accordance with the relationship:

(6) $$I = I_0 \sin^2 (B + A \sin \Omega t)$$

As will be explained hereinafter, the deviation of my system from the null is very small. For very small angles sine $\theta \to \theta$ so that Equation 6 for very small angles may be rewritten as:

(7) $\quad I = I_0 B^2 + 2 I_0 AB \sin \Omega t + I_0 A^2 \sin^2 \Omega t$

It will be apparent from Equation 7 that if $B=0$ only the $A^2 \sin^2 \Omega t$ term will remain, and it will contain only even harmonics of the frequency represented by $\Omega$. This corresponds to the condition represented in FIGURE 2($e$) in which the polarizers occupy the null position. If $B \neq 0$ and the signal is passed through a narrow band filter centered about the frequency corresponding to $\Omega$, which filter may be incorporated in the amplifier 24, then Equation 7 reduces to $I = 2 I_0 AB \sin \Omega t$. This expression contains a fundamental component and corresponds to the conditions represented in FIGURES 2($f$) and 2($g$). A change in the sign of B is equivalent to a change in the signe of $t$ since $\sin(-a) = -\sin a$. It will be seen that as the orientation of the polarizers 10 and 20 goes through a null position the phase of the output signal from the photocell 22 changes correspondingly to FIGURES 2($f$) and 2($g$). As has been explained hereinabove, the signal from the narrow band amplifier 24 passes to the phase-sensitive demodulator 26, the reference signal for which is derived from the oscillator 28 which supplies the Faraday cell excitation signal. Since the demodulator 26 has a very high rejection ratio for even order harmonics, it rejects the harmonic term of Equation 7.

As has been explained hereinabove, while the demodulator 26 has good linearity in recovering B from the photo tube signal in accordance with Equation 8 the demodulator output will not be a linear function of the relative angular displacement between the polarizers owing to their nonlinear response curve. If, however, the displacement of the polarizers from the null position is very small, the over-all linearity of the system will be good.

I apply the output voltage of the phase-sensitive demodulator 26 to an operational amplifier 36, the output signal of which as applied to the coil of the Faraday cell through a channel 38. I so arrange the system that the amplifier output is applied to the Faraday cell in a direction to introduce a rotation of the polarized beam which introduces a rotation of the beam which cancels the misalignment of the polarizers. Since the beam rotation is proportional to the field intensity of the magnetic field which in turn is proportional to the current in winding 18, the current in the winding is proportional to the misalignment between the polarizers 10 and 20. This is the desired electrical error signal which may be fed to a computer or the like through a channel 40.

In use of my polarizer I mount the light source and the analyzer components including Faraday cell 16, polarizer 20, and the associated electrical circuitry at a location displaced from the location of polarizer 10. Light source 12 directs its beam through the polarizer 10 onto the reflecting surface of mirror 14 which redirects the beam back to the Faraday cell 16 through which the beam passes to the polarizer 20. If the polarizers 10 and 20 are aligned with their planes of polarization at the null position, Faraday cell 16 oscillates the plane of polarization about the null to cause the intensity of the beam emerging from polarizer 20 to vary in accordance with FIGURE 2($e$). Phototube 22 produces an output signal proportional to the curve shown in FIGURE 2($e$) and amplifier 24 applies this signal to demodulator 26. Since, as is explained hereinabove, this signal contains only even harmonics of the frequency of oscillator 28, demodulator 26 rejects the harmonics and its output signal passes through zero. When the angle between the plane of polarization of the polarizers 10 and 20 shifts from the null position, the Faraday cell in effect scans a different portion of the response curve and the photocell output signal is of the nature of the curves shown in FIGURES 2($f$) or 2($g$). Since this signal contains a fundamental component, the phase-sensitive demodulator 26 produces an output signal having a polarity representing the direction of the displacement. Amplifier 36 amplifies this signal and applies it to the Faraday cell in a direction to shift the beam back toward the null to reduce the error signal toward zero.

It will be seen that I have accomplished the objects of my invention. I have provided a polarimeter for accurately determining the relative angular disposition between a pair of elements. My system locates the null position of a pair of polarizers with a high degree of accuracy. My system operates about a null with the result that its output has a very nearly linear relationship with the displacement of the polarizers from the null position. My system is phase-sensitive in that it produces a voltage having a magnitude proportional to displacement and a polarity representing the direction of displacement.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invetnion is not to be limited to the specific details shown and described.

Having thus described my invention, what I claim is:

1. A polarimeter including in combination an analyzer having an axis of polarization, a Faraday cell, a photo-sensitive device, means providing a single polarized beam of light, means for directing the beam to pass first through the cell and then through the analyzer to impinge on the device, an oscillator having a certain frequency $f$, means including the oscillator for exciting the cell, the device providing outputs having components of frequencies $f$ and $2f$ when the axis of the analyzer and the average plane of polarization of the beam emanating from the cell are related by other than an integral multiple of 90 degrees, the device providing a null output having no component of frequency $f$ when the axis of the analyzer and the average plane of polarization of the beam emanating from the cell are related by an integral multiple of 90 degrees, a phase-sensitive demodulator responsive only to the component of frequency $f$, said demodulator rejecting the component of frequency $2f$, means coupling the oscillator and the device to the demodulator and means responsive to the demodulator for producing a signal for actuating said Faraday cell and means for feeding said signal to said Faraday cell to rotate the average plane of polarization of the beam emanating from the cell to provide a null output from the device.

2. In combination: means for projecting a beam of plane-polarized light along a predetermined optical path;

Faraday cell means having Faraday core means located on said path for rotating the plane of polarization of said beam of light, said Faraday cell means having Faraday coil means for producing a magnetic field in said Faraday core means along said optical path;

a source of direct current connected to said Faraday coil means;

an analyzer mounted to receive said beam of light, said analyzer being mounted with its plane of polarization crossed relative to the average position of the plane of polarization of said beam of light at said analyzer;

a photodetector arranged to receive light transmitted by said analyzer for producing an electrical signal that varies in magnitude in accordance with the variation of intensity of the plane-polarized light transmitted through said analyzer;

an amplifier, selectively responsive to a frequency component of said signal of a predetermined fundamental frequency, for amplifying alternating current components of said signal developed in response to changes in intensity of the beam of light received by said photodetector;

means for supplying alternating current of said predetermined fundamental frequency to said Faraday coil means for causing the plane of polarization of said beam to oscillate about an average position determined by said direct current;

feedback means controlled by the magnitude of said alternating current component of fundamental frequency of said signal for controlling the magnitude of the direct current supplied to said Faraday coil means whereby changes in the magnitude of said alternating current component are opposed by resultant changes in said direct curent.

References Cited by the Examiner

UNITED STATES PATENTS

| 2,126,410 | 8/1938 | Pineo | 88—14 |
| 2,244,362 | 6/1941 | Hartig | 88—14 |
| 2,313,923 | 3/1943 | Chubb. | |
| 2,351,539 | 6/1944 | Peck | 88—14 |
| 2,438,422 | 3/1948 | Stearns | 88—14 |
| 2,829,555 | 4/1958 | Keston | 88—14 |
| 2,933,972 | 4/1960 | Wenking | 88—14 |
| 2,974,561 | 3/1961 | Hardy | 88—14 |

JEWELL H. PEDERSEN, *Primary Examiner.*

EMIL G. ANDERSON, FREDERICK M. STRADER, *Examiners.*